No. 780,830. Patented January 24, 1905.

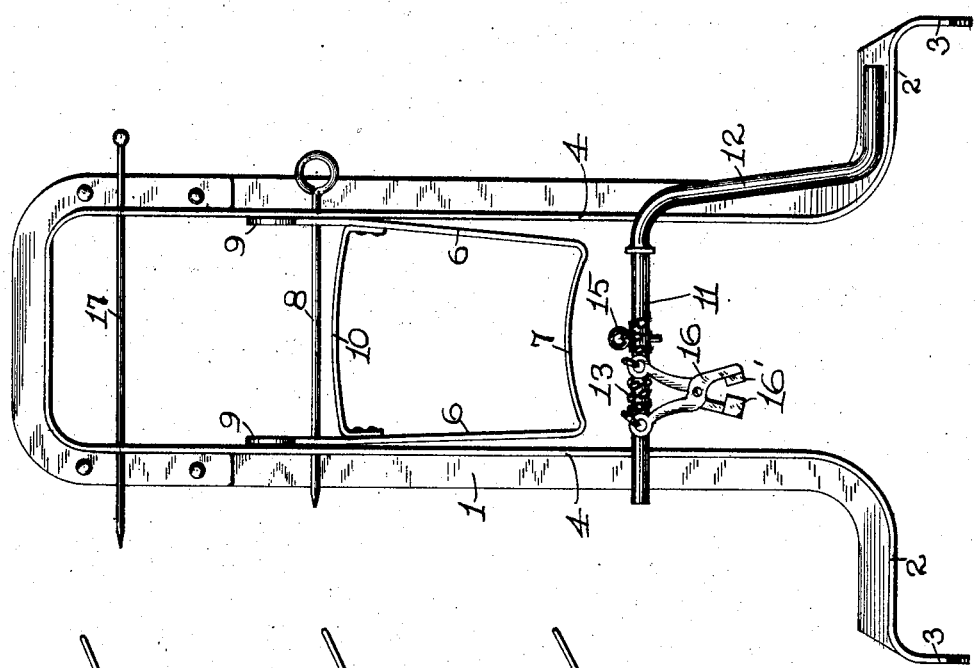

UNITED STATES PATENT OFFICE.

CHESTER F. STEPHENS, OF CARTHAGE, MISSOURI.

WIRE-STRETCHER.

SPECIFICATION forming part of Letters Patent No. 780,830, dated January 24, 1905.

Application filed April 11, 1904. Serial No. 202,497.

*To all whom it may concern:*

Be it known that I, CHESTER F. STEPHENS, a citizen of the United States, residing in Carthage, in the county of Jasper and State of Missouri, have invented certain new and useful Improvements in Wire-Stretchers, of which the following is a full, clear, and exact description, reference being had to the accompanying drawings, forming part of this specification.

My invention relates to an implement for stretching barb-wire or woven-wire fencing; and it consists in features of novelty hereinafter fully described, and pointed out in the claims.

Figure I is a perspective view illustrating my stretcher in position as utilized in stretching barb fence-wire. Fig. II is a view of the stretcher in folded condition.

A designates a fence-post to which fence-wires B lead to be secured to the post after being drawn taut in the use of my stretcher.

1 designates a metal frame that is of inverted-U shape. At the lower ends of the frame are feet 2, that are provided with prongs 3, which are adapted to be embedded in the ground adjacent to the fence-post to which the fence-wire is stretched to hold the stretcher in place without the use of side braces. The frame 1 is preferably of angle shape in cross-section to afford strength and rigidity, and in the facing wings 4 of the frame are apertures 5, located in pairs in horizontal lines to receive members to be referred to. The frame can, however, be made of any kind of bar-iron that is stiff enough to hold firmly and spread at the bottom to about two and one-half feet, with sharp points to insert in the ground. This spread is made to give ground surface enough to keep the machine from tipping sidewise when in use, thereby doing away with detachable side braces.

6 designates the arms of a U-shaped brace that are united by a cross member 7, that is adapted to bear against the fence-post A. The forward ends of the brace-arm 6 are connected to the frame 1 by a rod or pin 8, that passes through a pair of alining holes 5 in the frame-wings 4 and through the brace-legs 6, that are positioned within the frame 1 at a height corresponding to that of the fence-wire to be stretched. It will be seen that the rod or pin 8 seats loosely in said holes. Therefore upon the withdrawal of the rod the brace may be raised or lowered to the location of another pair of the holes 5, corresponding to the elevation of another fence-wire. The brace-legs 6 are furnished at their outer ends with eyes 9, and they are connected by a reinforcing-bar 10.

11 is a crank-shaft that is provided with a crank-handle 12 and passes loosely through the brace-leg eyes to rotate therein.

13 is a draw-chain or other flexible member that is connected to the crank-shaft 11 to wind thereon by means of an eye-pin 15, that is removably seated in a pin-hole extending transversely through the crank-shaft.

16 is a pair of grip-tongs the leverage-arms of which are connected to the branch ends of the draw-chain 13 and the jaws of which are designed to grip the fence-wire to be stretched. On one side of each jaw of the grip-tongs is a lip 16', the two lips being at opposite sides of the jaws, so that they will pass the interstices between the facing wire-gripping faces, thereby furnishing a complete closure around the wire when held between the jaws to prevent the escape of the wire and the loss of grip thereupon.

In stretching a long strand of wire it is sometimes necessary when the wire has been only partially stretched to go to the wire at a point where it has sagged down and become caught upon an object, such as a tuft of grass or weeds, and loosen it therefrom, and in so doing the incompletely stretched wire is shaken and unless the grip-tongs have a firm hold upon and entirely inclose the wire the wire is liable to slip sidewise from the jaws of the tongs and recoil, to the injury of the person handling it. By making the jaws of the tongs of the shape described it will be seen that it is impossible for them to lose their hold upon the wire, and therefore when the procedure referred to is gone through with it can be safely accomplished without the least liability of injury.

17 is a stop-pin that is removably inserted through a pair of the pin-holes 5 in the frame 1 in the path of rotation of the crank-shaft handle 12, by which said crank-handle is held after the fence-wire has been drawn taut until a staple is driven thereover into the fence-post to hold the wire previous to proceeding to the next fence-post with which the stretcher is associated for stretching action.

In the practical use of my wire-stretcher the parts in their assembled condition are placed adjacent to the fence-post, with the frame 1 in upright position and the cross member 7 of the brace resting against the fence-post, as seen in Fig. I. The crank-shaft being at this time rotatably mounted in the brace-eyes 9 and the stop-pin 17 being out of the frame, the grip-tongs 16 are applied to the fence-wire to be stretched and the crank-shaft is turned by its handle 12 until the desired degree of tautness of the wire is secured, due to the draw-chain being wound on the crank-shaft. The stop-pin 17 is then introduced into the frame 1 to hold the crank-shaft handle from retrograde rotation, and the staple or staples are driven into the post to hold the wire. The operator then releases the hold on the stretched wire and withdraws the rod or pin 8 and lowers the brace and crank-shaft combinedly to the elevation of the next wire to be stretched and reintroduces the rod 8 to uphold the members, as before. The same performance is gone through with respect to each wire to be stretched.

When the stretcher is not in use, it may be folded into compact condition by removing the crank-shaft and moving the brace into a position between the legs of the frame 1 as seen in Fig. II.

I claim as my invention—

1. In a wire-stretcher, the combination of a frame having legs provided with a plurality of pin-holes alined in horizontal pairs, a brace having a pair of pin-holes adapted to register with any pair of frame pin-holes, a pin passing loosely through said brace pin-holes and through a pair of said frame pin-holes, a crank-shaft journaled in said brace, wire-gripping means carried by said crank-shaft and a stop-pin removably inserted through a pair of the pin-holes in said frame in the path of rotation of the handle of said crank-shaft, substantially as set forth.

2. In a wire-stretcher, the combination of an inverted-U-shaped frame provided with pin-holes horizontally alined in pairs, a U-shaped brace having its legs positioned within said frame and having pin-holes adapted to register with any pair of frame pin-holes, a pin removably inserted through said brace pin-holes and through a pair of said frame pin-holes, eyes at the ends of said brace-legs, a crank-shaft rotatably and removably seated in said eyes, a draw-chain removably connected to said crank-shaft, and wire-grippers connected to said draw-chain, substantially as set forth.

CHESTER F. STEPHENS.

In presence of—
 NELLIE V. ALEXANDER,
 BLANCHE HOGAN.